United States Patent [19]

Imamiya et al.

[11] Patent Number: 5,368,081
[45] Date of Patent: Nov. 29, 1994

[54] PNEUMATIC RADIAL TIRE FOR PASSENGER CARS WITH DEFINED STEEL BELT CORD

[75] Inventors: Susumu Imamiya; Eiji Igarashi; Hisao Kato, all of Hiratsuka, Japan

[73] Assignee: The Yokohama Rubber Co., Ltd., Tokyo, Japan

[21] Appl. No.: 21,231

[22] Filed: Feb. 23, 1993

[30] Foreign Application Priority Data

Feb. 27, 1992 [JP] Japan .................. 4-041293

[51] Int. Cl.$^5$ .................................. B60C 9/18
[52] U.S. Cl. ........................ 152/451; 152/527
[58] Field of Search ............ 152/451, 526, 527, 538

[56] References Cited

U.S. PATENT DOCUMENTS

| | | | |
|---|---|---|---|
| 4,773,459 | 9/1988 | Yamaoka et al. | 152/209 |
| 4,819,705 | 4/1989 | Caretta | 152/526 |
| 4,836,262 | 6/1989 | Nishizawa et al. | 152/451 |
| 5,213,652 | 5/1993 | Katoh et al. | 153/527 |
| 5,229,069 | 6/1993 | Shemenski et al. | 152/451 |

FOREIGN PATENT DOCUMENTS

| | | |
|---|---|---|
| 0342492 | 11/1989 | European Pat. Off. . |
| 1303916 | 8/1974 | Germany . |
| 0234003 | 11/1985 | Japan .................. 152/526 |
| 63-307248 | 12/1988 | Japan . |
| 2-61185 | 3/1990 | Japan . |
| 2-61186 | 3/1990 | Japan . |
| 0307993 | 12/1990 | Japan .................. 152/451 |
| 0076882 | 4/1991 | Japan .................. 152/527 |
| 3213401 | 9/1991 | Japan .................. 152/451 |
| 91/14811 | 3/1991 | WIPO . |

OTHER PUBLICATIONS

Abstracts of JA 4-314604–JA 4-314606; Nov. 5, 1992.

Primary Examiner—Jeff H. Aftergut
Assistant Examiner—Nancy T. Krawczyk

[57] ABSTRACT

Highly durable, lightweight tires of a pneumatic radial type for passenger cars are constructed with a tread portion having on its outer peripheral surface a plurality of grooves arranged circumferentially of the tire and a belt layer formed from an array of steel cords and disposed in the tread. Each of the steel cords results from twisting a selected number of steel filaments each of specified contents of C, Si and Ni and has a specified level of tensile strength. The distance of rubber from a bottom end of each of the grooves to an outer surface of the steel-cord array is defined to be of a specified range as determined cross-sectionally of the tire.

3 Claims, 1 Drawing Sheet

PNEUMATIC RADIAL TIRE FOR PASSENGER CARS WITH DEFINED STEEL BELT CORD

BACKGROUND OF THE INVENTION

1. Technical Field

This invention relates to pneumatic radial tires for passenger cars and more particularly to such a tire having not only high durability performance but significant weight saving as well.

2. Prior Art

From the points of view of petroleum resource shortages coupled with environmental pollution problems, a keen demand has of late been voiced for fuel-saving motor vehicles. To cope with this trend, great concern has been focussed on the development of lightweight automobile tires. In the case of pneumatic radial tires for passenger cars, the goal of weight reduction or weight saving is expected to be achieved by three options, namely of (1) decreasing the number of steel cords to be counted as reinforcements for a belt layer, (2) minimizing the diameter of each of steel filaments to be applied to the steel cord, or (3) reducing the amount of rubber to be used to form a tread portion which is made relatively large in terms of the volume ratio in the whole tire.

Options (1) and (2) require that the belt layer have a tensile strength at a much higher level than usual. In such instance, a so-called ultrahighly strong steel filament abundant in carbon content is necessarily utilized to fabricate a steel cord of sufficient reinforcement for the belt layer. Although exhibiting good structural strength, higher carbon contents tend to make the resulting steel filament objectionably low in toughness and less resistant to flex fatigue in moist condition. This will lead to broken filament, thus resulting in marred durability of the ultimate tire.

To perform option (3), the tread portion needs to be so designed as to have a smaller gauge of groove bottom to cord surface. The term gauge used here refers to the distance or thickness of rubber from a bottom end of each of a multiplicity of main grooves formed circumferentially on the tread portion to an outer surface of one of steel cord arrays positioned nearer to the groove bottom. Conventional radial tires are usually in the range of 3.0 to 4.5 mm in that gauge and hence rather heavy in weight. In general, such a tire is susceptible, in the region of groove bottom ends, to intensely localized strains during running, which strains are responsible for broken steel cords and impaired tire durability. This adverse tendency can be said to become more noticeable when the gauge of groove bottom to cord surface is set at below 3.0 mm. Much poorer durability is particularly true of the case where the above steel filament of ultrahigh structural strength is employed.

SUMMARY OF THE INVENTION

It has now been found that highly durable, lightweight tires of a pneumatic radial type can be obtained by the use of steel cord arrays formed as a belt layer from steel filaments each of a high carbon content and specific silicon and nickel contents and providing a specific magnitude of tensile strength. The steel cord so available is conducive to ultrahigh structural strength and sufficient toughness as well as great resistance to flex fatigue and to corrosion even upon exposure to moisture. This in turn allows for a decreased number of steel cords to be counted and a limited gauge of groove bottom to cord surface to be set, contributing to reduced weight of the resultant tire while maintaining improved durability.

The present invention, therefore, seeks to provide a new pneumatic radial tire for passenger cars which is highly durable despite its considerable reduction in weight.

The above and other objects and advantages of the invention will be better understood from the following description taken in connection with the accompanying drawings.

More specifically, the invention provides a pneumatic radial tire for passenger cars which comprises (a) a tread portion having on an outer peripheral surface thereof a tread pattern which includes a multiplicity of principal grooves arranged in spaced apart relation and extending circumferentially of the tire and a multiplicity of subsidiary grooves arranged in spaced apart relation and extending axially of the tire, and (b) at least one belt layer formed from an array of steel cords and disposed in the tread portion in a circumferential direction, each of the steel cords resulting from twisting of one to five steel filaments and having a tensile strength of 330 to 360 kgf/mm$^2$, each of the steel filaments having a diameter of 0.20 to 0.38 mm and having a carbon content of 0.80 to 1.00% by weight, a silicon content of 0.50 to 1.00% by weight and a nickel content of 0.10 to 0.50% by weight, wherein the distance of rubber from a bottom end of each of the principal grooves to an outer surface of the array of steel cords is defined to be from 1.5 to 3.0 mm as determined cross-sectionally of the tire.

DETAILED DESCRIPTION OF THE INVENTION

Figure 1:
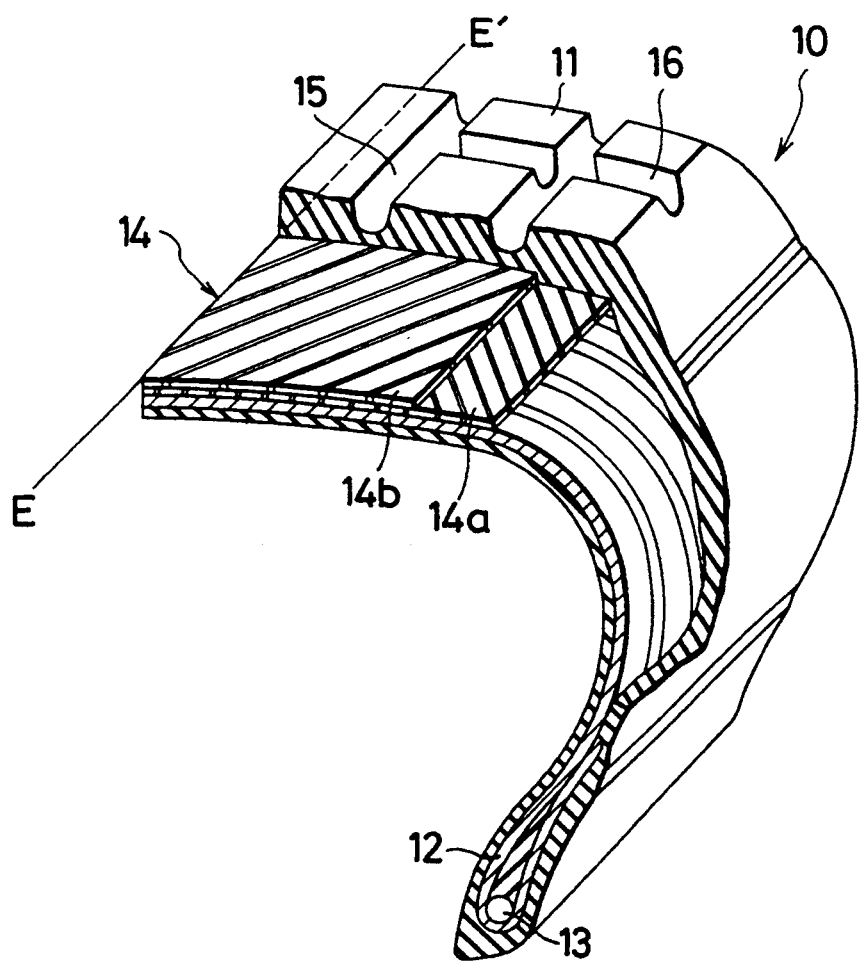
FIG. 1 is a perspective view, partly cut away, of the pneumatic radial tire according to the present invention.

Referring to the drawings and FIG. 1 in particular, there is shown a pneumatic radial tire 10 constructed in accordance with the present invention. The tire 10 is comprised of a tread portion 11 and a carcass ply 12 oriented to turn from inside to outside about two opposite bead cores 13, one seen in FIG. 1. Laid between the tread 11 and the carcass 12 is, by way of example, a double-layered, steel cord-based belt layer 14 with an inward belt 14a and an outward belt 14b, both such belts being disposed throughout the circumference of the tire 10. When taken along a phantom line E—E' of the tire 10 in a circumferential direction as depicted in FIG. 1, the belts 14a, 14b are positioned substantially at an angle of 90° relative to the orientation of the carcass 12. An array of steel cords 14c in the inward belt 14a is held in intersected relation to an array of steel cords 14d in the outward belt 14b at an angle of 5° to 40° with respect to the E—E' line. The tread 11 has on its outer peripheral surface a tread pattern which includes a multiplicity of principal grooves 15 arranged in spaced apart relation and extending circumferentially of the tire 10 and a multiplicity of subsidiary grooves 16 arranged in spaced apart relation and extending axially of the tire 10.

According to one important aspect of the invention, the steel cords 14c, 14d each should be fabricated from a selected class of steel filaments of specified physical characteristics, each such filament being structured to a carbon (C) content of 0.80 to 1.00%, a silicon (Si) content of 0.50 to 1.00% and a nickel (Ni) content of 0.10 to 0.50%, all percentages used here being indicated by weight. Thus, the steel cords 14c, 14d are of an ultrahighly strong nature with a tensile strength as large as 330 to 360 kgf/mm$^2$ and moreover with satisfactory toughness and substantial freedom from flex fatigue and corrosion even after moistening.

Figure 2:
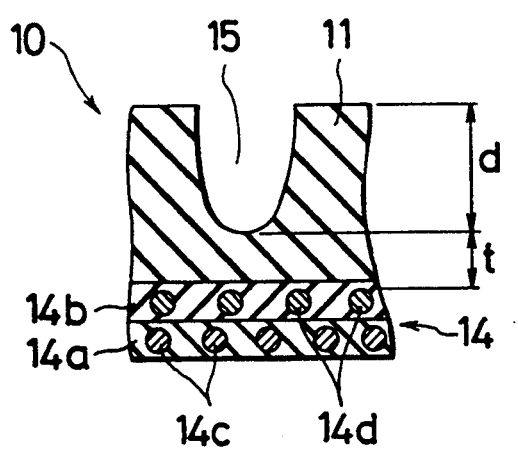
FIG. 2 shows a partly enlarged cross section of that tire to explain the positional relationship between a principal groove formed on a tread portion and a double-layered belt layer buried therein.

Further importantly, the length or thickness of rubber from a bottom end of each of the principal grooves 15 to an outer surface of one array of steel cords 14d in the outward belt 14b positioned nearer to the groove bottom should be set at from 1.5 to 3.0 mm as determined cross-sectionally of the tire 10. The length of rubber referred to above, as shown in FIG. 2, is designated at t as the gauge of groove bottom to cord surface. The principal groove 15 may be profiled at a depth d of about 8.0 to 9.0 mm as is commonly adopted in the art. The foregoing range of gauges of 1.5 to 3.0 mm is much smaller than usual, say 3.0 to 4.5 mm. This means that a tread portion may be formed with rubber considerably reduced in its amount, ensuring significant weight saving while maintaining improved tire durability supported by the use of the above specified steel cords. The gauge if below 1.5 mm, however, would be too small to protect the outward belt 14b against failure.

The steel filaments for use in the steel cords 14c, 14d may be processed by any suitable known mode of wire drawing. A steel stock, chosen to meet the requirements for C, Si and Ni contents, may for example be subjected to hot milling and if necessary to subsequent cooling, followed by primary wire drawing, patenting treatment, secondary wire drawing, further patenting treatment and brass plating. Finally, wet wire drawing may be effected to obtain the desired steel filaments. The content of C in the steel filament as specified above should be strictly observed in attaining convenient wire drawability of the corresponding steel stock and ultrahigh structural strength of the final steel filament. Si in its specified content acts to solidify ferrite and to improve wiry steel in its tensile strength, affording sufficient toughness and least breakage. Further, the content of Ni is specified to be essential as in the case of Si and also effective in improving corrosion resistance.

The steel filaments used herein should be drawn to a diameter of 0.20 to 0.38 mm, and one to five filaments may be twisted into a steel cord of 330 to 360 kgf/mm$^2$ in tensile strength. Above 330 kgf/mm$^2$ in that strength is necessary for reducing the number of steel cords to be counted for belt formation with reinforcing capability as desired, thus leading to a lightweight tire. Below 360 kgf/mm$^2$ compensates for adequate resistance to flexural fatigue and also to corrosive failure tending to arise from surface scars on the steel filaments which may occur during wire drawing.

The steel cord suitable in the invention is easily available by the use of a single steel filament of the above specified character or those filaments intertwisted into a structure of 1×2, 1×3, 1×4, 2×2, 1×5 or the like. Twisting and associated parameters are not specifically restrictive, but may be simple to follow in conventional manner.

To produce the tire of the invention, a given steel cord may be buried in a predetermined count number into a coat rubber in common use. The resulting belt is laminated on a drum with a tread, a carcass and other tire constituents to thereby prepare a green tire which is thereafter vulcanized in a mold as is accepted in the tire industry. Various other details as regards tire production fall within the general knowledge of one having ordinary skill in the art and will require no further explanation.

EXAMPLES

The present invention will now be further described way of the following examples which are given for purposes of illustration only.

Inventive tires 1 to 4 and comparative tires 1 to 7, all of 175/70R13 in size, were produced with a carcass ply formed from a fibrous polyester cord of 1,500 D/2 and with a steel cord formed from steel filaments each of 0.30 mm in diameter, 45 filaments/5 cm in count number and 1×2 (0.30) in twist structure. To facilitate comparison, those parameters including the content of each of C, Si and Ni in the steel filament, the fatigue life of that filament, the tensile strength of the steel cord and the gauge of groove bottom to cord surface were varied as per tabulated.

All the tires were checked for filament breakage resistance and tire durability performance on high-speed running, both after exposure to moisture, and tire weight saving with the results listed in the same table.

Indicated below are the test conditions followed in evaluating the qualities of the test tires.

Breakage Resistance of Steel Filament after Moistening

The test tire after being inflated to an air pressure of 1.7 kg/cm$^2$ was assembled with a 13×5-J rim and let to stand for 30 days in a relative humidity of 98% at 70° C. Travelling of the moistened tire was done in a distance of 300 km on a 1,707.6 mm-diameter drum with a slip angle of ±5° and a load of 350±220 kg while the angle and load factors were being varied with a short wave of 0,067 Hz. The tire was then cut open to inspect any steel filaments broken.

Tire Durability on High-Speed Running after Moistening

After being inflated to an air pressure of 2.1 kg/cm$^2$, the test tire was exposed to a moist atmosphere as was in the above test procedure, followed by travelling on a similar drum with a load of 420 kg at an initial speed of 121 km/hr and with a speed rise of 8 km/hr every lapse of 30 minutes. Durability was adjudged by the distance of travel required for the tire to continue to run until it was found to involve any appreciable failure. Comparison was made by taking the result of comparative tire 1 as a reference index of 100. The greater numerical figure, the more durable the tire was.

Tire Weight Saving

The weight of comparative tire 1 was taken as a reference index of 0. The smaller numerical figure, the more lightweight the tire was.

Fatigue Life of Steel Filament

The test steel filament was fixed between two eccentric shafts and then allowed to rotate in a 15%-aqueous solution of sodium chloride and with a bending stress of 100 kgf/mm$^2$. Measurement was made of the length of time required for that filament to become broken. Taken as a reference index of 100 was the result of the steel filament used in comparative tire 1. The greater numerical figure, the better the fatigue life was.

As demonstrated by the tabulated results, inventive tires 1 to 4 have been found satisfactory in respect of all the qualities tested.

Comparative tire 1 was insufficient in regard to tensile strength and fatigue life of the steel filament used. This was due to the Si and Ni contents in that filament being outside the range of the invention. An increased gauge of groove bottom to cord surface up to 3.5 mm prevented the steel filament from getting broken, but failed to improve durability quality and weight saving.

Comparative tire 2 was made similar to comparative tire 1 except that the gauge was reduced to 3.00 mm within the range of the invention. The resulting tire proved to be acceptably durable and lightweight and, at the same time, revealed broken steel filament and eventually marred durability property.

Comparative tire 3 was constructed as in comparative tire 1 but with a smaller gauge of 2.5 min. In spite of further improved in durability quality and weight reduction, objectionably broken steel filament occurred in comparative tire 3 as did in comparative tire 2.

Comparative tire 4 was similar to inventive tire 1 for the exception of use of too small a gauge of 1.00 min. Comparative tire 4 involved adverse breakage of the steel cord, leading to poorer durability than comparative tire 1.

Comparative tires 5, 6 and 7 were produced by modifying inventive tire 1 in their respective levels of tensile strength to 365 kgf/mm² outside the range of the invention. Each of these comparative tires showed a decline in fatigue life, causing the steel cord to break even with a gauge within the range of the invention.

What is claimed is:

1. A pneumatic radial tire for passenger cars which comprises:
   (a) a tread portion having on an outer peripheral surface thereof a tread pattern which includes a multiplicity of principal grooves arranged in spaced apart relation and extending circumferentially of the tire, and a multiplicity of subsidiary grooves arranged in spaced apart relation and extending axially of the tire; and
   (b) at least one belt layer formed from an array of steel cords and disposed in said tread portion in a circumferential direction, each of said steel cords resulting from twisting of one to five steel filaments and having a tensile strength of 330 to 360 kgf/mm², each of said steel filaments having a diameter of 0.20 to 0.38 mm and having a carbon content of 0.80 to 1.00% by weight, a silicon content of 0.50 to 1.00% by weight and a nickel content of 0.10 to 0.50% by weight, wherein the distance of rubber from a bottom end of each of said principal grooves to an outer surface of said array of steel cords is in the range of 1.5 to 3.0 mm as determined cross-sectionally of the tire.

2. The tire according to claim 1 further including a belt layer formed from an array of steel cords substantially of the same structure as the first-mentioned array of steel cords and positioned beneath the first-mentioned belt layer such that the first- and last-mentioned arrays of steel cords are held in intersected relation to each other at a predetermined angle with respect to the circumference of the tire.

3. The tire according to claim 2, wherein said angle is in the range of 5° to 40°.

* * * * *

| tire | steel cord characteristic | | | | fatigue life | filament breakage after moistening | durability on high-speed running after moistening | gauge (mm) | weight saving |
|---|---|---|---|---|---|---|---|---|---|
| | C (%) | Si (%) | Ni (%) | tensile strength (kgf/mm²) | | | | | |
| CT 1 | 0.82 | 0.20 | >0.01 | 320 | 100 | not broken | 100 | 3.5 | 0 |
| CT 2 | 0.82 | 0.20 | >0.01 | 320 | 100 | broken | 106 | 3.0 | −1.9 |
| CT 3 | 0.82 | 0.20 | >0.01 | 320 | 100 | broken | 111 | 2.5 | −3.8 |
| IT 1 | 0.85 | 0.85 | 0.15 | 340 | 180 | not broken | 106 | 3.0 | −1.9 |
| IT 2 | 0.85 | 0.85 | 0.15 | 340 | 180 | not broken | 111 | 2.5 | −3.8 |
| IT 3 | 0.85 | 0.85 | 0.15 | 340 | 180 | not broken | 110 | 2.0 | −5.7 |
| IT 4 | 0.85 | 0.85 | 0.15 | 340 | 180 | not broken | 106 | 1.5 | −7.6 |
| CT 4 | 0.85 | 0.85 | 0.15 | 365 | 180 | broken | 90 | 1.0 | −9.5 |
| CT 5 | 0.85 | 0.85 | 0.15 | 365 | 130 | broken | 106 | 3.0 | −1.9 |
| CT 6 | 0.85 | 0.85 | 0.15 | 365 | 130 | broken | 111 | 2.5 | −3.8 |
| CT 7 | 0.85 | 0.85 | 0.15 | 365 | 130 | broken | 110 | 2.0 | −5.7 |

CT: comparative tire
IT: inventive tire